United States Patent [19]

Hoag

[11] Patent Number: 4,734,916
[45] Date of Patent: Mar. 29, 1988

[54] LASER OSCILLATING APPARATUS

[75] Inventor: Ethan D. Hoag, Boston, Mass.

[73] Assignee: Laser Corporation of America, Lowell, Mass.

[21] Appl. No.: 841,626

[22] Filed: Mar. 20, 1986

[51] Int. Cl.$^4$ ................................................. H01S 3/03
[52] U.S. Cl. ........................................ 372/65; 372/58; 372/34
[58] Field of Search ................ 372/58, 55, 34; 372/61

[56] References Cited

U.S. PATENT DOCUMENTS

| | | | |
|---|---|---|---|
| 4,096,449 | 6/1978 | Foster | 372/58 |
| 4,099,143 | 7/1978 | Foster | 372/58 |
| 4,571,730 | 2/1986 | Mizoguchi | 372/58 |
| 4,573,159 | 2/1986 | Azgano et al. | 372/58 |
| 4,618,960 | 10/1986 | Nazemi | 372/87 |
| 4,635,269 | 1/1987 | Reilly et al. | 372/58 |

Primary Examiner—Léon Scott, Jr.
Attorney, Agent, or Firm—William W. Habelt

[57] ABSTRACT

A laser oscillating apparatus has a compact, simple structure by utilizing the laser housing itself as an optical bench. Means for thermal expansion and contraction in the longitudinal direction of the laser housing are supported in the laser housing as a united body. The blower which circulates the lasing gases is constructed of a plurality of fans mounted for separate thermal expansion and contraction, enabling the use of high speed fans. Means are provided between the blower and the lasing region for cooling and smoothing the gas flow. The cap of the laser apparatus is arranged at the strength center of the housing to ensure a gas-tight interior.

7 Claims, 22 Drawing Figures

LASER OSCILLATING APPARATUS

BACKGROUND OF THE INVENTION

The present invention relates to a laser oscillating apparatus, and in more detail, pertains to a laser oscillating apparatus of the three perpendicular axis type which is formed in an extremely compact manner and which is easy to use.

As an example of the laser oscillating apparatus which is compactly designed, there may be mentioned, for example, the device disclosed in U.S. Pat. No. 4,099,143.

The prior art apparatus is composed by enclosing a pair of discharge electrodes, a blower for sending a flow of gas to the lasing region formed between the discharge electrodes, and heat exchangers for cooling the gas flow, in a cylindrical laser housing, and providing a pair of mirrors of the resonator on both ends of the spacer rod that extends penetrating through the laser's housing.

However, in such a prior art laser oscillating apparatus, there is provided an optical bench that has spacer rods, separate from the laser housing, due to the necessity of supporting the attitude of the mirrors of the optical resonator mirrors with high procision. This leads to a complexity and an increase in weight of the oscillation unit and to a high cost of the laser oscillating apparatus.

For instance, in the above example, the spacer rods penetrate through the laser housing and the mirrors of the optical resonator are provided on their both ends. Therefore, it becomes necessary to provide special means such as to cover the mirror section with bellows in order to preserve the gas-tight integrity of the laser housing.

Furthermore, the laser oscillating apparatus should be manufactured in such a way as to facilitate assemblage, repairs, and adjustments. However, these operations for the conventional laser oscillating apparatus have not necessarily been made easy.

For example, each element of the enclosed structures is mounted individually in the laser's housing. Therefore, mounting and dismounting of each element in and out of the laser's housing require much trouble, and also matching among various elements is rather difficult.

Moreover, when a compact design for a high performance laser oscillating apparatus is attemped, there will be required a fast rotating blower that is to be operated in an environment with large temperature variations. However, the customary blower is unable to fully satisfy that requirement so that it is difficult to obtain a desired gas flow.

SUMMARY OF THE INVENTION

An object of the present invention is to provide a compact, light weight, and inexpensive laser oscillating apparatus that has a simple structure of the optical bench for supporting the mirrors of the optical resonator.

Another object of the present invention is to provide a laser oscillating apparatus which is easy to assemble, repair, and adjust.

Still another object of the present invention is to provide a laser oscillating apparatus which permits the generations of a desired gas flow in the laser's housing by constructing a blower to be installed in the laser's housing so as to be able to rotate at a high speed.

Still another object of the present invention is to provide a laser oscillating apparatus which is equipped with a gas flow smoothing means that does not generate a large turbulence in the gas flow that is created in the laser's housing.

Still another object of the present invention is to provide a laser oscillating apparatus, the thermal expansion and contruction of whose structures do not interfere with the laser's housing.

Still another object of the present invention is to provide a laser's housing which is pressure resistant.

In order to attain the above objects, the present invention utilizes the laser's housing itself also as an optical bench, and the units of the enclosed structures are stored in the interior of the housing as free to expand and contract as well as free to be mounted and dismounted. Further, the fans of the blower are given a divided construction and the fans are made to be free to expand and contract thermally with respect to the blower casing, in order to realize a fast rotation of the blower. Moreover, prior to being introduced to the lasing region space, the gas flow that is created by the blower is given a proper control by providing such means as for smoothing and cooling the flow. Still further a cap is arranged to be united at the location of the strength center of the housing proper, as a means of preserving gas-tight integrity of the laser's housing.

EMBODIMENTS OF THE INVENTION

Figure 1:
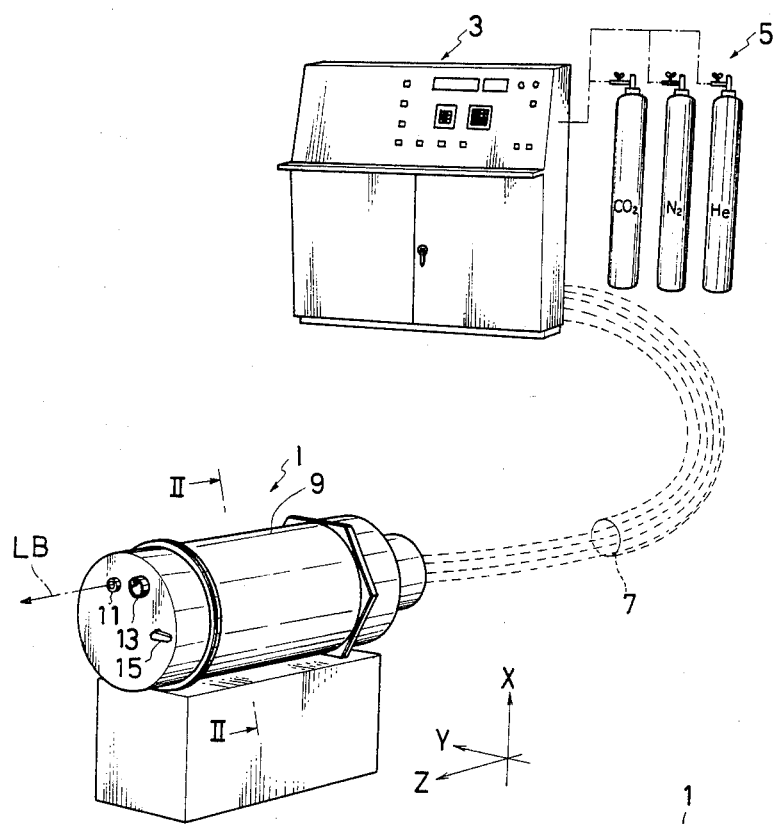
FIG. 1 is a perspective view of the laser oscillating apparatus.

As shown in FIG. 1, the laser oscillating apparatus is comprised of a laser oscillation unit 1, a control panel 3 for summarily controlling the oscillation unit 1, accessory equipment 5, and a connecting members 7 which connect the laser oscillation unit 1 and the control panel 3.

The laser oscillation unit 1 is comprised of a cylindrical laser's housing in which are stored oscillation elements. On the side surface at left of the housing 9, there are provided an output window 11 for outputting the laser beam LB in the direction of the optical axis Z, a peephole 13 for peeping the interior of the housing, and a handle 15 manual operation of which enables to interrupt temporarily the outputting of the laser beams.

The control panel 3 includes a keyboard operation unit and a control unit for summarily controlling the elements to be controlled in the interior of the laser oscillation unit 1. The control unit carries out all-inclusive control of various kinds of electrical controls, filling up and exhaustion of gasses such as $CO_2$, $N_2$ and He, temperature control and supply control of the cooling water, and so forth.

Included in the accessory equipment 5 are gas bombs of $CO_2$, $N_2$ and He shown in the figure and the cooling machine, not shown, for manufacturing cooling water.

Figure 2:
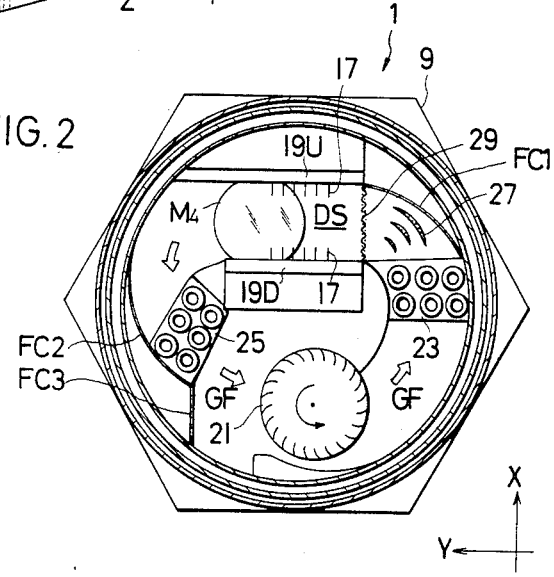
FIG. 2 is an enlargement of the cross-section along II—II of FIG. 1 which depicts schematically the set-up of the laser resonation unit that represents the principal part of the laser resonator.

As shown schematically in FIG. 2, in the upper part in the interior of the laser's housing 9, a pair of upper and lower discharge electrodes 19U and 19D that have numerous pin-shaped electrodes 17 are provided along the longitudinal direction (namely, the Z direction) of the housing 9, with a predetermined spacing between them. Underneath these discharge electrodes 19U and 19D, there is provided a blower 21 which produces a counterclockwise gas flow in the housing 9 by rotating in the counterclockwise direction in the figure.

Between the blower 21 and the lasing region DS formed by the discharge electrodes 19U and 19D, there are provided heat exchangers 23 and 25 that are arranged in the upstream and downstream, respectively, of the gas flow GF, along the longitudinal direction of the housing 9. Between or near the blower 21, heat exchangers 23 and 25, and the discharge electrodes 19U and 19D, there are suitably provided flow controlling plates $FC_1$, $FC_2$, $FC_3$, and others for smoothing the gas flow GF. Further, in the upstream side of the lasing region DS, there are provided flow regulating plates 27 and screen 29. Hereafter, the directions of altitude and gas flow GF in the lasing region DS will be referred to as the X and Y axes, respectively.

Figure 3:
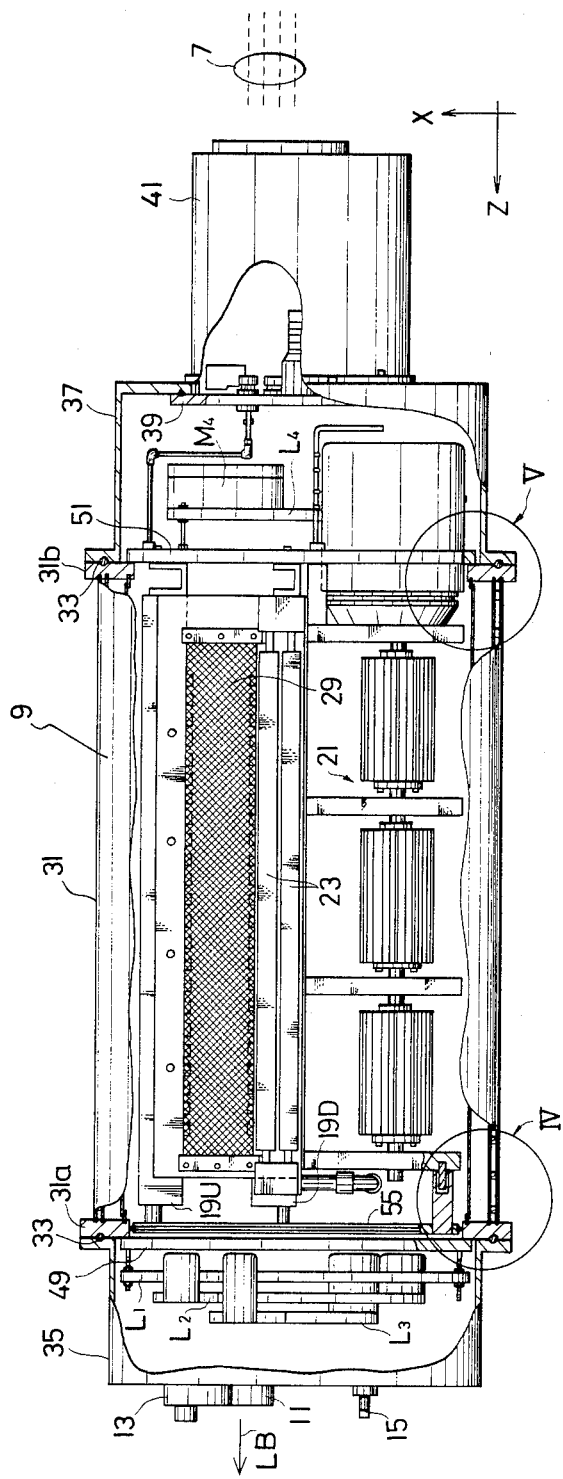
FIG. 3 is a side view of the laser oscillation unit which depicts the interior arrangement of the cylindrical housing by a partial cutaway.
Figure 4:
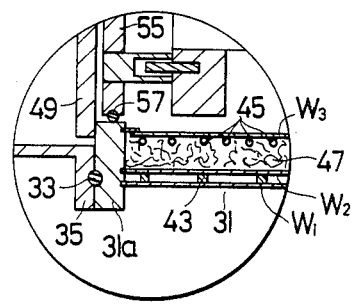
FIG. 4 is an enlarged view of the encircled portion IV of FIG. 3.
Figure 5:
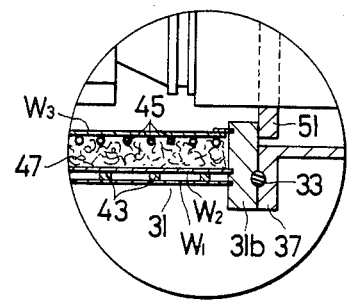
FIG. 5 is an enlarged view of the encircled portion V of FIG. 3.

As shown in FIGS. 3 to 5, the laser's housing is comprised of a cylindrical housing proper 31 that is equipped on its both sides with a front side flange 31a and a rear side flange 31b, front and rear end caps 35 and 37 that are joined to the flanges 31a and 31b via O-rings 33 placed at the strength centers of the flanges 31a and 31b, respectively, a sealing plate 39 that is joined to an aperture which is created on the side surface of the cap 37, and a cover 41 that covers the sealing plate 39. On the sealing plate 39 there are provided a multitude of joint members for taking in the connecting members 7 to the interior of the housing.

The housing proper 31 is constructed by double walls $W_1$ and $W_2$, and on its inner side there is appended another wall $W_3$ to be used for heat shielding and for electromagnetic shielding. The walls $W_1$ and $W_2$ are made of an aluminum alloy, and the surface of the wall $W_1$ is given a specified surface treatment such as oxidation treatment, in order to improve its anti-scratch property. Between the double walls $W_1$ aknd $W_2$ there is wound helically a partitioning member 43, and there is passed through cooling water in the helical space that is partitioned by the partitioning member 43.

The inner wall $W_3$ is placed on the inner side of the wall $W_2$ with a predetermined spacing, and around the wall $W_3$ there is wound a copper cooling tube 45 through which is passed cooling water. The wall $W_3$ is made of a metal such as copper, aluminum, or other that has a good thermal conductivity. Further, between the walls $W_2$ and $W_3$ there is filled glass fiber 47 as a heat insulator.

The wall $W_3$, together with the heat exchangers 23 and 25 shown in FIG. 2, actively absorbs the heat that is generated internally and imparts the heat absorved to the cooling water to cool the gas flow strongly. Further, the wall $W_3$ has in its surroundings glass fiber as heat insulator so that it can shut out radiation of heat to the outside. Moreover, the wall $W_3$ is made of a metallic material with good heat conductivity such as cooper, aluminum, or other so that it can prevent the leaking of electromagnetic waves into the exterior.

By the above effects due to the wall $W_3$, the walls $W_1$ and $W_2$ are protected from being subjected to a large quantity of heat, and moreover, the temperature of the walls $W_1$ and $W_2$ can always be mainted at a predetermined level since the influence of internally generated heat can hardly reach the outside since the cooling water is passed through between the walls $W_1$ and $W_2$, and since they are affected by the outside temperature either.

The attaching positions of the O-rings 33 are chosen at the strength centers for the walls $W_1$ and $W_2$, as was mentioned earlier. By positioning the O-rings 33 at the positions of the strength center for the wall $W_1$ and $W_2$, it becomes possible to receive the external pressure applied on,the caps 35 and 37 at the strength center of the housing proper 31, minimizing the deformation in the housing proper 31 due to the external pressure.

Moreover, the wall $W_3$ need not necessarily be made completely gas tight with respect to the wall $W_2$. The reason for this is that in contrast to the necessity for the case of complete sealing of giving a considerable thickness to the wall $W_3$ in consideration for the pressure to which the wall $W_3$ is subjected, even if there is a penetration in the present case of internal gas into the space between the walls $W_3$ and $W_2$, the gas will be trapped by the glass fiber so that sufficient heat insulation can be expected without permitting the flow of the gas. However, in view of shielding electromagnetic waves it is not desirable to create ventilation holes that are too large in size.

On the side surface of the front side flange 31a there is attached a ring member for front side 49. On the outside surface of the ring member 49 there are mounted a first L-shaped member $L_1$ with a folding mirror, a second L-shaped member $L_2$ with a primary mirror, and a third L-shaped member $L_3$ with an output mirror. The method for mounting the L-shaped members $L_1$, $L_2$, and $L_3$ and the mirrors to be attached to each of them will be described in detail by referring to FIG. 7 and subsequent figures.

On the side surface of the rear side flange 31b there is mounted a rear side ring member 51 on whose outside surface is attached a fourth L-shaped member $L_4$ with a folding mirror $M_4$. The method for mounting the L-shaped member $L_4$ and the folding mirror $M_4$ to be attached on it will be described in detail in FIG. 11.

Figure 6:
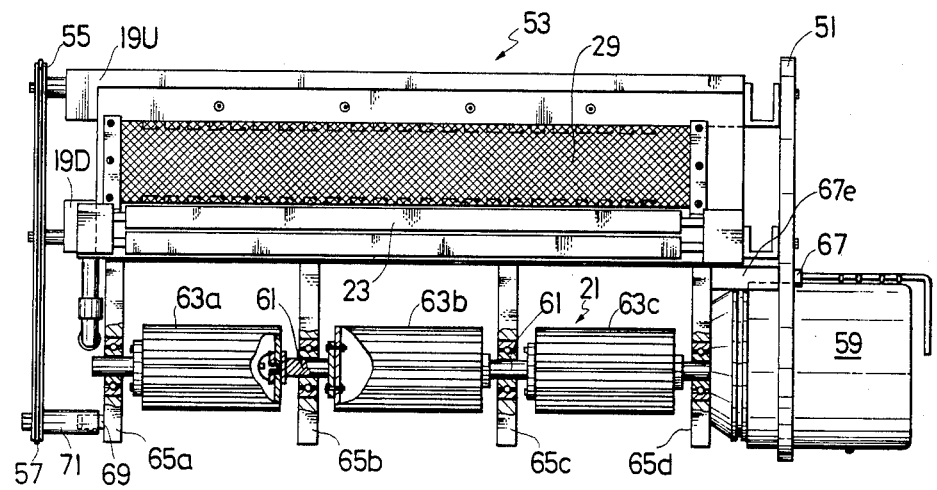
FIG. 6 is a side view which depicts in enlargement the structures situated in the interior of the laser oscillation unit in which it shows a part of it as a cross-sectional view as well as it shows the blower part by removing the gas flow smoothing screens that surround it.

As shown in FIG. 6, on the inside of the ring member 51 there is mounted a unit 53 that consists of the discharge electrodes 19U and 19D, the heat exchangers 23 and 25 (see FIG. 2), the blower 21, and others. The unit 53 represents the internal structures to be exposed during oscillation of the laser to the flowing gas, made in a united body so as to be mountable and dismountable with respect to the laser's housing proper.

The rear side of the internal structures of the unit 53 is joined to the ring member 51, while its front side is joined to a sliding ring member 55.

Embedded along the peripheral surface of the sliding ring member 55 is an O-ring 57 which is made of a poor heat conducting material. The sliding ring member 55 is placed on the inside surface of the frontside flange 31a shown in FIG. 3, so as to be freely slidably along the longitudinal direction of the housing. Consequently, the sliding ring member 55 is to be slided within the frontside flange 31a in accordance with the thermal expansion and contraction of the unit 53. Further, the O-ring 57 is made of a poor heat conducting material so that not much heat will be transferred from the sliding ring member 55 to the front-side flange 31a which is a part of the housing proper 31.

The construction of the discharge electrodes 19U and 19D will be described in detail by referring to FIGS. 16 to 19.

The heat exchangers 23 and 25 are of the type in which fins are attached to the cooling tubes.

On the upstream side in the gas flow of the discharge electrodes 19U and 19D there is provided a screen 29 whose function will be described in detail later by referring to FIG. 15.

The blower 21 consists of a motor 59 in whose interior is passed through cooling water, a linking shaft 61, and three fan unit 63a, 63b, and 63c that are linked by the linking shaft 61.

For the linking shaft 61 use are made of the so-called stub shafts that are supported freely rotatably via bearings by four supporting blocks 65a, 65b, 65c, and 65d. Each of the supporting blocks 65a, 65b, 65c, and 65d is joined suitably to the flow controlling plate that serves as well for the casing of the blower 21.

The rear-side block 65d is fixed with two bolts 67 (see FIG. 11) to the rear-side ring member 51 via spacer 67e. At the lower portion of the front-side block 65a there is provided protruding from it a pin member 69 which is-inserted freely slidably in a cavity of a guiding member 71 that is provided at a lower portion of the inside surface of the sliding ring member 55. The positions for attaching two bolts 67 and a pin member 69 on the cross-sectional planes are configured to form the three vertices of a triangle. Here, the sliding ring member 55 forms a part of the casing for the blower 21.

The assemblage of the blower 21 is accomplished by first joining the block 65d to a flow controlling plate that constitutes a part of the casing, fixing the motor 59 to the block with bolts, then connecting the fan 63c, block 65c, fan 63b, block 65b, and so forth, by interposing stub shaft as appropriate.

Since the blower 21 is supported by three points, namely, two bolts 67 and the pin member 69, it can be supported securely between the rear-side ring member 51 and the sliding ring member 55.

The unit fans 63a, 63b, and 63c have sectional structure, with blocks 65b and 65c interposed between neighboring units. Further, the pin member 69 is supported freely slidably in the direction of the optical axis Z. Consequently, each of the fans 63a, 63b, and 63c and the rotation shafts can expand or contract in the longitudinal direction alone, without being distorted in the lateral direction.

For these reasons, in the blower 21 shown in the present example, it becomes possible to rotate the fans 63a, 63b, and 63c up to the fast speed of, for example 24,000 rpm. Moreover, there is generated no stress due to temperature changes between the ring members 51 and 55 that form the supporting means for the unit, and no distortion will arise in the housing proper 31.

Figure 7:
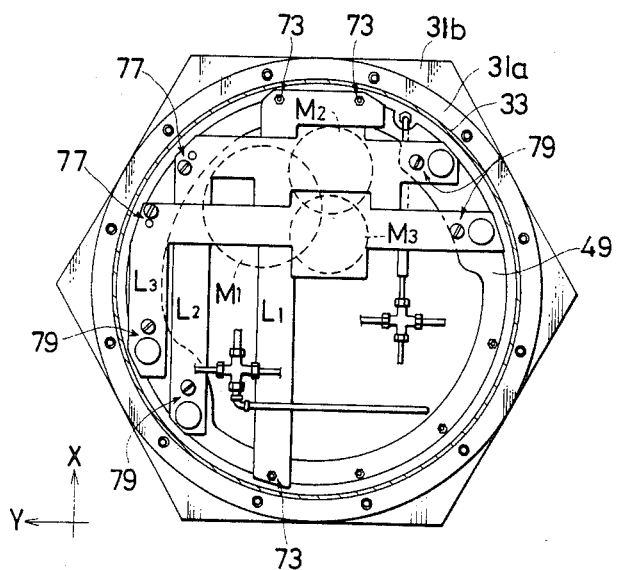
FIG. 7 is a side view from the left of FIG. 3 as shown under the state in which the left-side cap is removed from the laser oscillation unit shown in FIG. 3.

As shown in FIG. 7, the first, second, and third L-shaped members $L_1$, $L_2$ and $L_3$ with the front folding mirror $M_1$, the primary mirror $M_2$, and the output mirror $M_3$, respectively, are fixed to the front-side ring member 49 via the fixing means 73, 77, and 79, in the order of first, second, and third members.

Figure 8A:
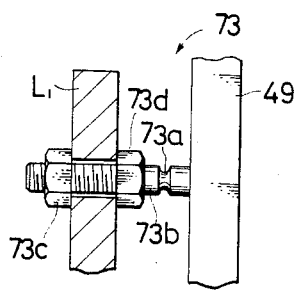
FIGS. 8(a), FIG. 9 and FIG. 10 are respectively the explanatory diagrams for illustrating the affixing means of the L-shaped members to the laser's housing.

As shown in FIG. 8, a fixing means 73 comprises a stud bolt 73b that has a narrow part 73a and two nuts 73c and 73d. By adjusting the positions of the nuts 73c and 73d at predetermined positions on the bolt 73b, the position of the first L-shaped member $L_1$ with respect to the ring member 49 can be adjusted. The narrow part 73a is for absorbing a fine thermal deformation in the front-side ring member 49 when there is generated such a fine deformation. Further, the narrow part 73a is for absorbing the amount of rotation when the L-shaped member $L_1$ is rotated by a minute quantity around the X or Y axis with the bolt 73b as the fulcrum.

By adjusting the positions of the nuts 73c and 73d of the fixing means 73 that are provided at both ends of the letter L, it is possible to adjust the rotation, around the X or Y axis by a minute amount without strain, of the front folding mirror $M_1$ that is mounted on the back side of the figure. Moreover, even if a minute thermal distortion is generated in the front-side ring member 49, the narrow part 73a can absorb such a distortion and makes it possible to maintain with high precision the attitude of the folding mirror $M_1$.

Figure 9:
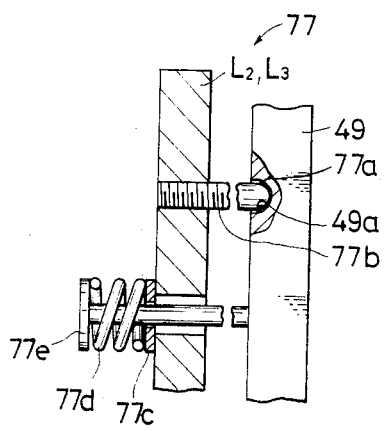

As shown in FIG. 9, a fixing means 77 is comprised of a stud bolt 77b and a bolt 77e that is equipped with a spring 77d. The bolt 77b is buried on the side of center of the letter L of the L-shaped member $L_2$ or $L_3$, and the rounding 77a at its tip is fitted into a cavity 49a in the ring member 49. The bolt 77e is buried on the side of the ring member 49, penetrates through a hole drilled in the L-shaped member $L_2$ or $L_3$, and elastically presses the L-shaped member $L_2$ or $L_3$ via a washer 77c by a virtue of elastic force of spring 77d. The diameter of the cavity 49a is chosen to be slightly larger than the diameter of the bolt 77b and a rounding is given in its bottom portion so as to let it function as a pivoting bearing. The diameter of the hole provided in the L-shaped member $L_2$ or $L_3$ is given a size which is sufficiently larger than the diameter of the bolt 77e.

The spring 77d is for elastically pressing all the time the L-shaped member $L_2$ or $L_3$ with predetermined force to the side of the ring member 49. Since the cavity 49a functions as a pivoting bearing, the L-shaped member $L_2$ or $L_3$ is capable of rotating around the X or Y axis with the cavity 49a as a fulcrum.

Figure 10:
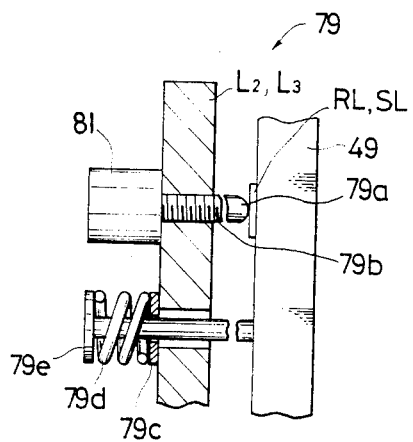

As shown in FIG. 10, a mounting means 79 is mounted on both ends of letter L of the L-shaped member ($L_2$ or $L_3$), and includes similar to the fixing means 77, a washer 79c, a spring 79d, and a bolt 79e. However, for the mounting means 79 there is provided a motor 81 for rotating a bolt 79b. Further, the tip of the bolt 79b is placed on a rail RL or a sliding plate SL. The rail RL is a member which makes a pressed contact with the tip of the bolt 79b at the lower ends of the L-shaped members $L_2$ and $L_3$ in FIG. 7. The rail RL guides the tip of the bolt 79b in the up and down direction X over two linear members. Further, the sliding plate SL is a plate-like member which makes a pressed contact with the tip of the bolt 79b at the right-hand ends of the L-shaped member $L_2$ and $L_3$ in FIG. 7.

Consequently, the attitude of the L-shaped members $L_2$ and $L_3$ becomes adjustable around the X or Y axis by driving the motor 81 of the mounting means 79 that is provided at the tip portion of the letter L. Hence, the attitude of the primary mirror $M_2$ and the output mirror $M_3$ that are attached to the L-shaped members $L_2$ and $L_3$, respectively, becomes readily adjustable from outside.

Figure 11:
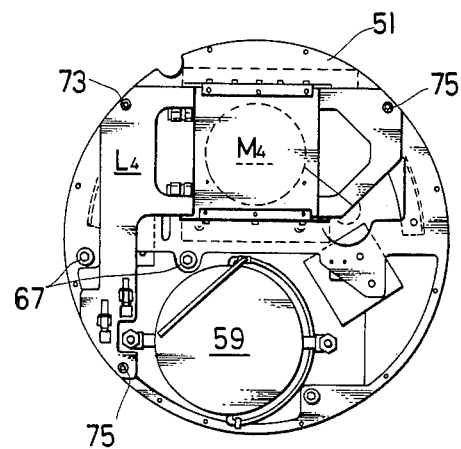
FIG. 11 is a right side view of FIG. 6.

As shown in FIG. 11, the fourth L-shaped member $L_4$ with the rear folding mirror $M_4$ is mounted on the rear-side ring member 51 using a means that is similar to the fixing means 73 shown in FIG. 8. Here, however, the stud bolt 73b in the figure penetrates through the rear-side ring member 51 and is buried in the rear-side flange 31b that shows smaller thermal deformations.

The L-shaped members $L_1$, $L_2$, $L_3$, and $L_4$ are individually mounted directly to the housing proper 31 that is shown in FIG. 3, and are isolated thermally from the unit 53. Accordingly, these members $L_1$, $L_2$, $L_3$, and $L_4$ will not suffer from deformation due to heat that is generated internally, and hence it becomes possible to maintain the attitude of each mirror attached to them with high precision.

Figure 12:
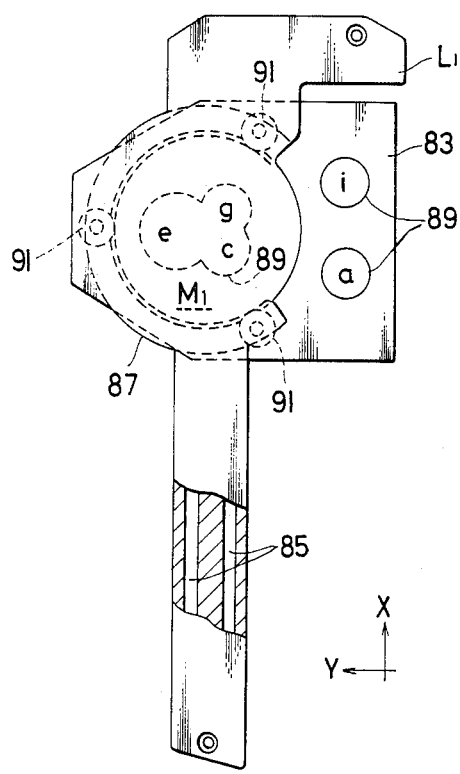
FIG. 12 is a front view of the first L-shaped frame.
Figure 13:
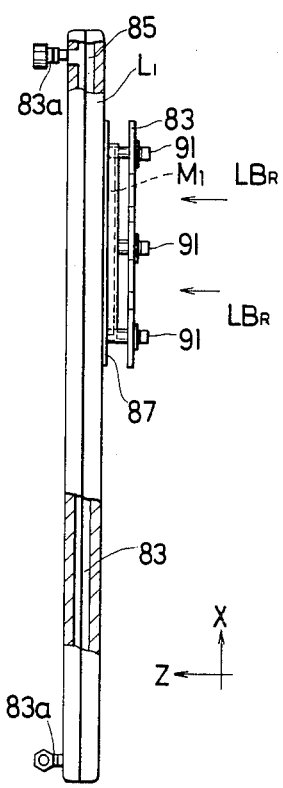
FIG. 13 is a right side view of FIG. 12.

As shown in FIG. 12 and FIG. 13, the first L-shaped member $L_1$ includes the front folding mirror $M_1$ and a masking member 83.

The L-shaped member $L_1$ is provided with nipples 83a for connecting the cooling tubes, and in its interior there is provided a cooling water passage 85 that is connected to the nipples 83a. The passage 85 is given a labyrinthian form as needed in order to cool the L-shaped member in a uniform manner.

The front folding mirror $M_1$ is held pressed against the L-shaped member $L_1$ by means of a pressing plate 87.

The masking member 83 which has predetermined apertures 89 at positions through which the laser beams in resonance $LB_R$ are to pass, is fixed to the L-shaped member $L_1$ together with the pressing plate 87 with a bolt 91. The reference symbols a, c, e, g, and i refer to the reflection or passing points of the laser beams $LB_R$ in resonance.

The masking member 83 is made of a material with good heat conductivity such as copper or aluminum, and is fixed to the L-shaped member $L_1$ with bolts 91 that have good heat conductivity (for instance, brass bolts). Accordingly, the masking member 83 shown in the present example is indirectly cooled by the cooling water that passes through the cooling water passage 85. Therefore, it actively absorbs the laser beams $LB_R$ that deviate from the predetermined path and improves the mode characteristics of the output laser beams LB. Incidentally, when it is attemped to suppress the parasitic oscillation modes in the laser beams in resonance $LB_R$ that have deviated from the predetermined path, by forming a masking member 83 in the reflecting surface, it is necessary to provide a masking surface that is mirror surface finished, to the reflecting surface. Moreover, the attitude of the masking member has to be adjusted to a predtermined one in order to have the reflected light directed in the predetermined direction. However, when the laser beams that have deviated from the optical path are absorbed actively by the surface of the masking surface 83, as in the present example, it becomes unnecessary to give a surface finishing of high precision to the masking member 83. Further, the attitude of the masking member 83 may be chosen to be parallel to the L-shaped member, for instance, so that it becomes possible to manufacture the masking member 83 easily and inexpensively. The masking member 83 has the effect of actively cooling the gas flow also.

In addition, although not shown in the figure, it is possible to improve heat absorption by the masking member 83 by interposing as many heat conducting members as possible between the masking member 83 and the L-shaped member $L_1$, for instance, by increasing the number of the bolts 91. Further, it may also be arranged to let the cooling water pass on the inner surface of the masking member.

On the fourth L-shaped member $L_4$, too, there is provided a masking mechanism for masking the area other than the predetermined reflecting points. In addition, also for the L-shaped members $L_2$, $L_3$, and $L_4$ there are provided cooling means that are similar to those shown in FIGS. 12 and 13.

Figure 14:
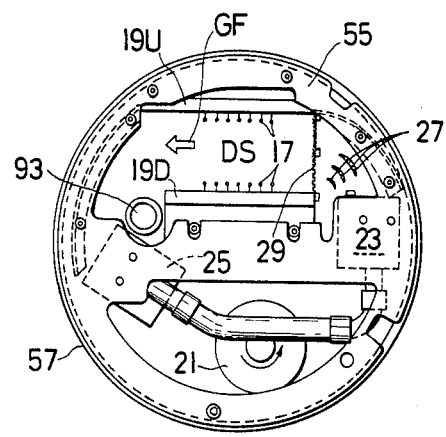
FIG. 14 is a left side view of FIG. 6.
Figure 15:
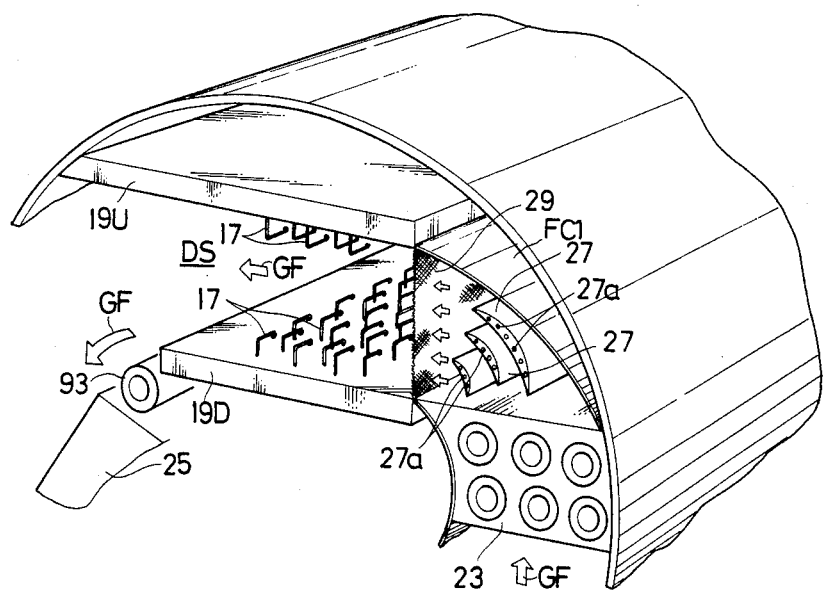
FIG. 15 is an explanatory perspective view for illustrating the gas flow.

As shown in FIG. 14 and FIG. 15, in the upstream side of the lasing region DS there is provided a screen 29. Between the screen 29 and the upstream side heat exchanger there are provided flow regulating plates 27 as a regulating and cooling means, for the gas flow. Further, between the lower discharge electrode 19D and the heat exchanger 25 there is provided a ceramic tube 93.

The screen 29 is for regulating the gas flow GF that enters the lasing region DS by making it regular macroscopically and turbulent microscopically in order to uniformize the gas flow in the lasing region DS. Moreover, to cool the pin-shaped electrodes more effectively and not to generate too much turbulence in the gas flow GF, the extended portions (namely, the horizontal portions) of the pin-shaped electrodes 17 that have their tips bent approximately circularly inward are arranged to be orthogonal to the direction of the gas flow GF.

The flow regulating plates 27 are formed in what is called aerodynamic shape, with paths for cooling 27a in their interior. The flow regulating plates 27 are provided plural in number between the screen 29 and the heat exchanger 23, and keep space of the velocity on the outside with that on the inside of the gas flow GF that comes out of the heat exchanger 23 and also cool down the gas flow GF. Now, it cannot be denied that the flow regulating plates give certain degree of resistance to the gas flow GF. However, the regulating plates 27 regulate and cool the gas flow GF so that they improve the discharge efficiency and hence enhance the overall energy efficiency of the laser oscillating apparatus.

Between the discharge electrode 19D and the heat exchanger 25 there is provided a ceramic tube 93. The ceramic tube 93 is for suppressing the occurrence of a large turbulent flow in the gas flow GF between the discharge electrode 19D and the heat exchanger 25. Here, although it is somewhat disadvantageous from the cost viewpoint, it may be arranged to form the end surface of the dielectric substance on the downstream side of the discharge electrode 19D into a form which is approximately circular, instead of providing the ceramic tube 93.

With the arrangement described in the foregoing, there is created a circulatory flow for the gas flow GF, which circulates in the order of the heat exchanger 23, the flow regulating plates 27 the screen 29, the lasing region DS, and the heat exchanger 25, enabling to obtain a predetermined regulated flow in the lasing region DS.

Figure 16:
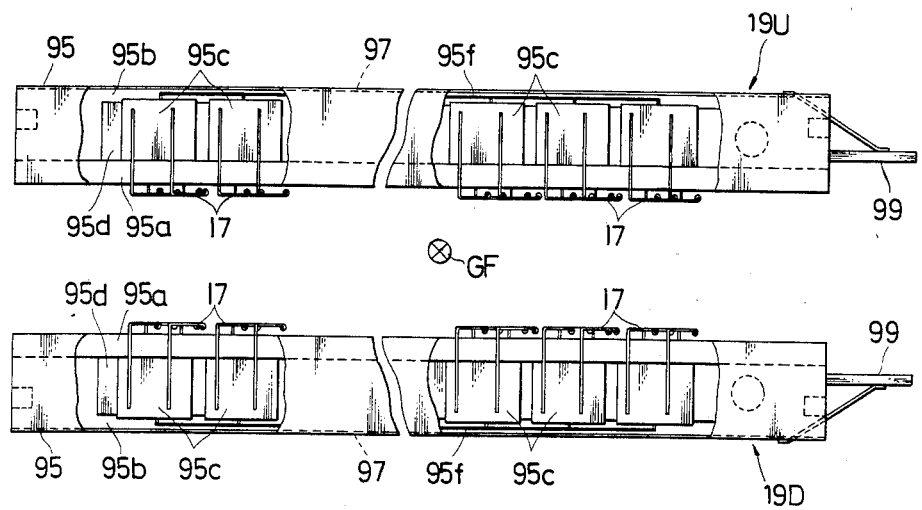
FIG. 16 is a side view the discharge electrodes.
Figure 17:
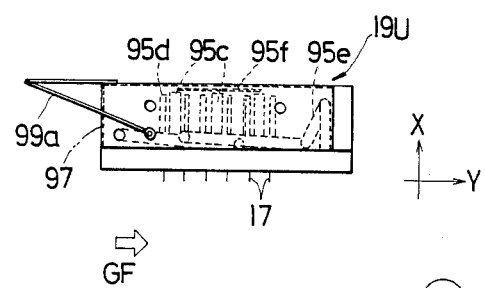
FIG. 17 is a right side view of the upper discharge electrode shown in FIG. 16.
Figure 18:
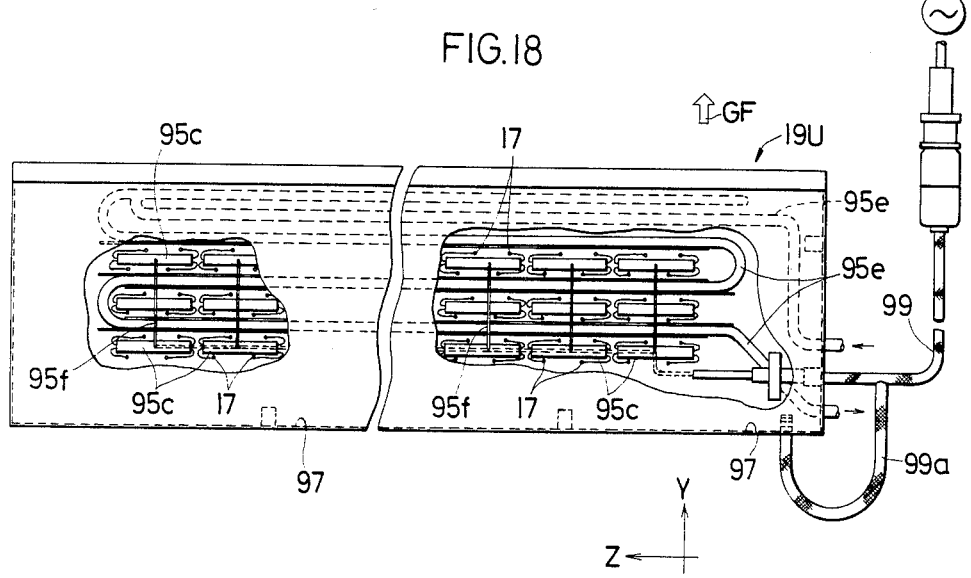
FIG. 18 is a plan view of the upper discharge electrode shown in FIG. 16.

As shown in FIG. 16 to FIG. 18, the upper and lower discharge electrodes 16U and 16D are prepared symmetrically.

The discharge electrodes 19U and 19D have a multitude of pin-shaped electrodes 17. A pin-shaped electrode 17 is made by bending a wire whose tip is curled approximately circularly, into the form of the letter L, with a predetermined distance from the tip. It is comprised of a curled part which is curled in circular form, an extended part that extends from the curled part, and a support part which intersects orthogonally with the extended part. The support part is buried in the substrate 95 in a mode so as to have the extended part to be orthogonal to the gas flow.

The substrate 95 comprises a dielectric substance 95a made of ceramic material, a molded part 95b. capacity units 95c arranged in the molded part 95b, heat absorbing plates 95d that partition the units 95c, a cooling tube 95e (not shown in FIG. 16) that makes contact with the plates 95d and the dielectric substrate 95a, and a shielding plate 97 that covers the molded part 95b.

A capacitor unit 95c stores four capacitors in its interior, with the common terminal of each of the capacitors connected to a common line 95f, while the other terminal of each of the capacitors connected respectively to the support part of one of the four pin-shaped electrodes 17 that are arranged adjacent to the capacitor unit 95c.

The condition of connected between a capacitor unit 95c and the pin-shaped electrodes 17 is illustrated exclusively in FIG. 18.

Supplied to a power source line 99 is a high frequency alternating current. The power source line 99 is the so-called shielding wire, and the grounding wire 99a wound around its surface skin is connected to the shielding plate 97.

The shielding plate 97 is made of a current conducting material such as copper or aluminum, and has an effect of preventing the radiation leakage into the exterior of the elctromagnetic waves that are generated by the electrical wirings, capacitors, or others in the interior.

The discharge electrodes 19U and 19D are made by inserting the support parts of the pin-shaped electrodes 17 into a multitude of small holes that are drilled in the dielectric substrate 95a, joining the support parts to the capacitor unit 95c as shown in FIG. 18, and then molding a molded part 95b by the use of a predetermined metallic mold, and by covering the molded part 95b with the shielding plate 97.

By the above procedure, the discharge electrodes 19U and 19D can be formed in modules so that the pin-shaped electrodes 17, the dielectric substrate 95a, the capacitor unit 95c, and the cooling tube 95e can be formed into a compact and united form.

Figure 19:
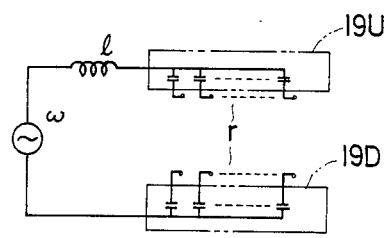
FIG. 19 is a view of electrodes 19A and 19D each having their own capacitors.

As shown in FIG. 19, the discharge electrodes 19U and 19D have separately their own capacitors. A power source of frequency w which is supplied via a coil with suitable inductance l is applied to each of the discharge electrodes 19U and 19D, and in the lasing region DS a homogeneous discharge will be carried out with a resistance of the medium r. Here, impedance matching is carried out by varying the relation between the inductance l of the coil and the total capacity c of the capacitor to satisfy $wl = 1/wc$, with the values of both sides of the equation to be sufficiently large compared with the value of the resistance r. With this, it becomes possible to increase the capacity between the electrodes, and to realize a stable glow discharge with high capacity.

In the present example, arrangement is made to cool the interior of the substrate 95 so that there will be no heating of discharge electrodes 19U and 19D, and it becomes possible to realize a stable discharge and prolong the life of the discharge electrodes 19U and 19D. The internal cooling effect will become more conspicious since there is provided a heat absorbing plate 95d. Further, the interior is molded so that there will be no filtration of a gas such as helium in the capacitor area, and hence, there will occur no trouble such as breakdown of insulation even if use is made of mica condensers.

Assemblage of the laser oscillating unit 1 will be carried out by first assembling the unit 53 shown in FIG. 6, and then inserting it into the housing proper 31 shown in FIG. 3 through the side surface at right, to the condition as shown in the FIG. 6. For this reason, on the rear-side flange 31b there are provided beforehand stud bolts that match the bolt insertion holes (no reference numeral given) that are created on the peripheral surface of the rear-side ring member 51 shown in FIG. 11.

Next, the L-shaped member $L_4$ shown in FIG. 11 is mounted by utilizing a part of the stud bolts.

Further, on the flange 31a on the other side of the housing proper 31, there are mounted the front-side ring member 49 on which are attached each of the L-shaped members $L_1$, $L_2$, and $L_3$. These L-shaped members $L_1$, $L_2$, and $L_3$ may be mounted on the front-side ring member 49.

Next, tubing and wiring works are carried out before the shielding plate 39, rear-side cap 37 is covered, joint processing is carried out using the shielding plate 39, and the cover 41 is mounted. Further, after carrying out mirror adjustment and others as needed, then the cap 35 is mounted.

In the present example, the internal structures that are subject to thermal expansion and contraction are put into a united body so that it becomes possible to carry out all of the assembling work, repairs, and adjustment work for the internal structures on the outside of the laser's housing 9.

Now, as shown in FIG. 16 to FIG. 19, if a discharge like in the present example is carried out by using an AC power source, then there will take place a discharge in the lasing region DS which is uniform vertically, so that it is possible to extend effectively the lasing region DS in the attitude direction X.

Therefore, in the present example, the laser beams $LB_R$ in resonace are arranged to pass through the following three-dimensional path in the lasing region DS whose region is extended in the above manner.

Figure 20:
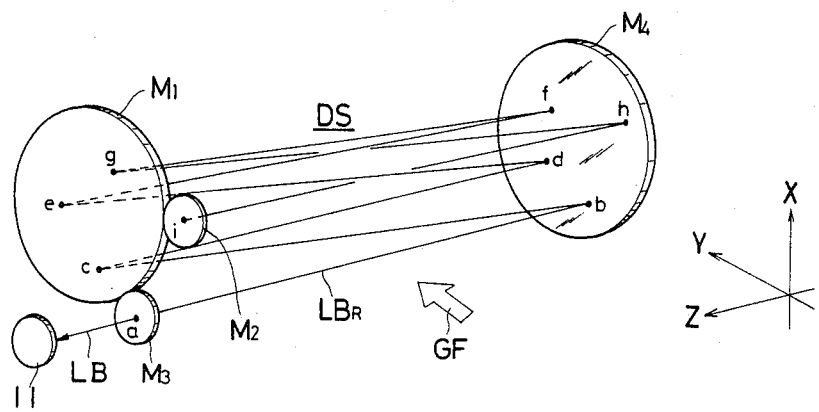
FIG. 20 is a perspective explanatory view of the optical resonator.

As shown in FIG. 20, in the interior of the cylindrical housing proper 31, there are arranged facing each other a relatively large front folding mirror $M_1$ and a rear folding mirror $M_4$ which is inclined by a predetermined angle with respect to the mirror $M_1$. In the neighborhood of the edge of the front folding mirror $M_1$, there are arranged a relatively small primary mirror $M_2$ and an output mirror $M_3$ with predetermined respective attitudes. The two folding mirrors $M_1$ and $M_4$ and the output mirror $M_3$ are formed flat, while the primary mirror $M_2$ is formed concave. The reflection factor of the primary mirror $M_2$, is nearly 100% and the reflection factor of the output mirror $M_3$ is 60% (the transmission factor of 40%).

Each of the mirror $M_1$, $M_2$, and $M_3$ are arranged in such a way as to have the laser beams in resonance $LB_R$ are reflected or passed through at point a, or at point i. Point a is reflection point for the output mirror $M_3$, point i is the reflection point for the primary mirror $M_2$, points b, d, f, and h are the refletion points for the rear folding mirror $M_4$, and points c, e, and g are the reflection points for the front folding mirror $M_1$.

Figure 21:
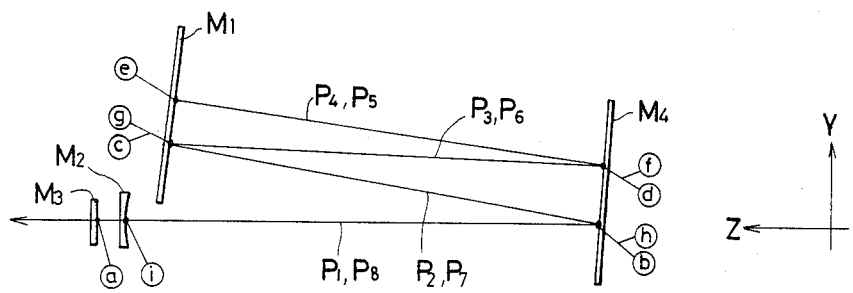
FIG. 21 is an explanatory diagram for the path of a laser ray shown as a plan view of FIG. 20.
Figure 22:
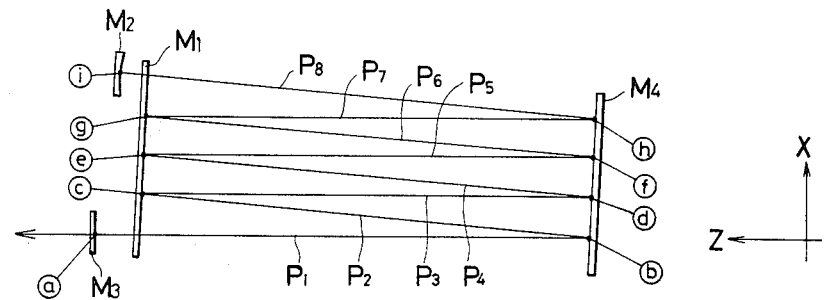
FIG. 22 is an explanatory diagram for the path of a laser ray shown as a plan view of FIG. 20.

As shown in FIG. 21 and FIG. 22, the laser beams in resonace $LB_R$ passes through eight paths $P_1$ to $P_8$ in which during the time the beams make one round trip in the altitude axis (the discharge axis) X they make two round trips in the gas flow axis Y. Namely, the laser beams that are reflected at points in the order of the points b, c, d, and e while they pass through the paths $P_1$ to $P_4$ by traveling in the reverse direction of gas flow Y. The set of reflection points c, e, and g and the set of reflection points d, f, and h for the folding mirrors $M_1$ and $M_4$, respectively, are configured distributed in the plane of each mirror so that the laser beams in resonance $LB_R$ pass through three-dimensional paths $P_1$ to $P_8$ As in the above, it becomes possible to reduce the separation between the resonating mirrors and to guarantee the uniformity of reflection of the laser beams $LB_R$ in the up-down and left-right directions, so that the output mode of the output laser beams LB can be made satisfactory.

Moreover, according to the present example, adjustment of the resonating mirrors is extremely easy. Namely, in the present example, the primary mirror $M_2$ and the output mirror $M_3$ are mounted on the L-shaped members $L_2$ and $L_3$, respectively, whose attitude can be adjusted by means of the separate motors 81. Accordingly, it becomes possible for the operator to adjust easily the attitude of the primary mirror $M_2$ and the output mirror $M_3$ so as to make the output from the output mirror $M_3$ maximum, by operating a joy stick that is provided on the outside of the laser's housing 9.

The matching of the folding mirrors $M_1$ and $M_2$ is carried out by removing the caps 35 and 37 on the laser's houding 9, and then by projecting a visible laser beam from a distant position on one side of the laser's housing 9. That is, on each of the folding mirrors $M_1$ and $M_2$ there is provided individually a thick glass plate that faces each of these mirrors. At the opposite portions on these glass plates there are provided respectively small holes that are drilled exactly in the direction of the Z axis. Therefore, by adjusting the L-shaped members $L_1$ and $L_2$ so as to let the light that was projected from one side of the laser's housing 9 to pass through both of the small holes, it becomes possible to adjust the relative inclination between both mirrors to coincide with a predetermined value.

Moreover, in the present embodiment, description has been given in conjunction with an example of a housing proper 31 which is a cylindrical body of truly circular cross-section with a structure that is two-layered strength-wise and triple-layered geometrically. However, the housing proper may be such a structure that it is single-layered strength-wise and double-layered geometrically. That is, it may be arranged to provide a heat shielding plate $W_3$ as in the above in the interior of a single-walled cylindrical body, and to cool the cylindrical body, as may be required, by winding cooling tubes around the single-layered wall.

Furthermore, the housing proper do not have to be a cylindrical body with truly circular cross-section, and it may be cylindrical body with, for example, quadrilateral cross-section or hexagonal cross-section.

Still further, in the present embodiment, one end of the unit 53 is fixed to one end of the housing proper 31, while the other end of the unit 53 is let free to slide in the housing proper 31. However, it may be arranged to give a sufficient strength to the wall $W_3$ of the housing proper 31, fix a mid point of the unit 53 to the wall $W_3$, and let both ends of the unit 53 free to slide with respect to the housing proper 31. Further, it may be arranged to let both ends of the unit 53 be supported elastically by both ends of the housing proper 31, and let the thermal expansion and contraction in the unit 53 be absorbed elastically.

Since the present invention may be embodied in various forms so that the scope of the present invention is not limited to the present embodiment alone. The scope of the present invention is defined by the accompanying claims so that it includes modifications to the present embodiment that do not deviate from the fundamental features of the present invention.

What is claimed is:

1. A laser oscillating apparatus comprising:
   a. a cylindrical outer housing having a first end cap at one end thereof and a second end cap at the opposite end thereof to form a gas tight enclosure;
   b. temperature maintenance means for maintaining said outer housing at a substantially constant temperature;
   c. a plurality of mirrors disposed in reflecting relationship at the opposite ends of said outer housing so as to repeatedly reflect a ray of radiation through a lasing region defined along the optical path between the opposed mirrors;
   d. laser oscillating means comprising paired discharge electrodes oppositely positioned along the optical path between the opposed mirrors and defining therebetween the lasing region, gas flow generating means for producing a circulatory flow of lasing gas through the lasing region between the paired discharge electrodes, and heat excahnger means disposed in circumferentially spaced relationship within said outer housing between the opposed mirrors; and
   e. means for supporting said laser oscillating means within said outer housing comprising a first ring member fixedly mounted to said outer housing at one end thereof, a second ring member slidably translatible with respect to said outer housing disposed is supporting contact with said outer housing at the opposite end thereof, and internal supporting means for mounting the discharge electrodes, the gas flow generating means, and the heat transfer means to at least said first ring member thereby forming a unitized structure the slidably translatable second ring member being freely longitudinally movable within asid outer housing to compensate for a temperature differential between said unitized structure and the substantially constant temperature outer housing in responses to thermal expansion and contraction of the unitized structure.

2. A laser oscillating apparatus as recited in claim 1 further comprising: a first annular flange extending radially inwardly from said outer housing at one end thereof; a second annular flange extending radially inwardly from said outer housing at the opposite end thereof; and an inner cylindrical wall mounted to and extending between the first and second annular radially inwardly extending flanges of said outer housing so as to enclose the laser oscillating means, said first ring member fixedly mounted to one of the annular radially inwardly extending flanges, and said second ring member supported from and slidably translatible along the inner circumferential surface of the other of the annular radially inwardly extending flanges.

3. A laser oscillating apparatus as recited in claim 2 further comprising heat insulating material disposed intermediate said inner cylindrical wall and said outer housing.

4. A laser oscillating apparatus as recited in claim 2 further comprising cooling means around the outer surface of said inner cylindrical wall.

5. A laser apparatus as recited in claim 2 wherein the first end cap is joined to one of the annular flanges extending radially inwardly from the outer housing and the second end cap is joined to the other of the annular flanges extending radially inwardly from the outer housing, the first and second end caps being joined to their respective flanges at the position of strength center of said outer housing with an annular sealing ring disposed between each end cap and its respective flange so as to hermetically seal the housing.

6. A laser oscillating apparatus as recited in claim 1 wherein said outer housing comprises a first cylindrical shell and a second cylindrical shell disposed coaxially about the first cylindrical shell in circumferentially spaced relationship therewith therby forming an annular space circumscribing the first cylindrical shell, and said temperature maintenance means comprises means for passing a cooling fluid in heat exchange relationship through said annular space.

7. A laser apparatus as recited in claim 1 wherein the heat exchange means comprises a first heat exchanger disposed between the gas flow generating means and the paired discharged electrodes upstream with respect to the circulatory gas flow of the lasing region, and second heat exchanger disposed between the gas flow generating means and the paired discharge electrodes downstream with respect to the circulatory gas flow of the lasing region.

* * * * *